(12) United States Patent
Depondt (10) Patent No.: US 9,463,778 B2
(45) Date of Patent: Oct. 11, 2016

(54) WIPER DEVICE (75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 13/994,123

(22) PCT Filed: Nov. 11, 2011

(86) PCT No.: PCT/EP2011/069908
§ 371 (c)(1),
(2), (4) Date: Sep. 10, 2013

(87) PCT Pub. No.: WO2012/079868
PCT Pub. Date: Jun. 21, 2012

(65) Prior Publication Data
US 2013/0333145 A1 Dec. 19, 2013

(30) Foreign Application Priority Data
Dec. 13, 2010 (DE) ........................ 10 2010 062 917

(51) Int. Cl.
*B60S 1/40* (2006.01)
*B60S 1/38* (2006.01)

(52) U.S. Cl.
CPC .................. *B60S 1/40* (2013.01); *B60S 1/386* (2013.01); *B60S 1/4048* (2013.01); *B60S 1/4087* (2013.01); *B60S 1/3849* (2013.01); *B60S 2001/4061* (2013.01)

(58) Field of Classification Search
CPC ...... B60S 1/40; B60S 1/4038; B60S 1/4045; B60S 1/4048; B60S 1/4083; B60S 1/4087; B60S 2001/4058; B60S 2001/4061

USPC ........... 15/250.32, 250.31, 250.351, 250.43, 15/250.44, 250.361
See application file for complete search history.

(56) References Cited

U.S. PATENT DOCUMENTS

| 2,977,141 | A | * | 3/1961 | Ryck ............................ 403/189 |
| 5,920,950 | A | * | 7/1999 | Young et al. .............. 15/250.32 |
| 2004/0244137 | A1 | | 12/2004 | Poton |
| 2006/0230571 | A1 | * | 10/2006 | Son ............................ 15/250.32 |
| 2007/0289079 | A1 | * | 12/2007 | Van Bealen .............. 15/250.32 |
| 2012/0110773 | A1 | * | 5/2012 | Thielen et al. ............. 15/250.32 |

FOREIGN PATENT DOCUMENTS

| DE | 1108580 | * | 6/1961 |
| DE | 2624723 | * | 12/1977 |
| DE | 102009000762 | | 8/2010 |
| EP | 0141186 | | 5/1985 |
| EP | 2143603 | | 1/2010 |
| FR | 1218175 | * | 12/1959 |

(Continued)

OTHER PUBLICATIONS

International Search Report for Application No. PCT/EP2011/069908 dated Dec. 30, 2011 (3 pages).

*Primary Examiner* — Gary Graham
(74) *Attorney, Agent, or Firm* — Michael Best & Friedrich LLP (57) ABSTRACT

The invention is based on a wiper device for a motor vehicle window, with a wiper arm adaptor unit (10*a*-10*f*) and a wiper blade adaptor unit (12*a*-12*f*), which, in a fitted state, form a form-fitting connection. It is proposed that the wiper device has a housing means (18*a*-18*f*) which is arranged fixedly on the wiper blade adaptor unit (12*a*-12*f*) for receiving the wiper arm adaptor unit (10*a*-10*f*) in a linear push-in movement.

9 Claims, 7 Drawing Sheets (56) References Cited

FOREIGN PATENT DOCUMENTS

| | | | |
|---|---|---|---|
| FR | 2868378 | | 10/2005 |
| FR | 2929216 | | 10/2009 |
| GB | 2348118 | A * | 9/2000 |
| JP | 2005537978 | | 12/2005 |
| KR | 100903374 | | 6/2009 |
| SU | 1735093 | | 5/1992 |
| WO | 2007122568 | | 11/2007 |
| WO | WO2008/122453 | A1 * | 10/2008 |
| WO | WO2008/136579 | A1 * | 11/2008 |

* cited by examiner

WIPER DEVICE

BACKGROUND OF THE INVENTION

The invention proceeds from a wiper device.

There is already known a wiper device for a motor vehicle window, with a wiper arm adapter unit and a wiper blade adapter unit which form a positive connection in a mounted state.

SUMMARY OF THE INVENTION

The invention proceeds from a wiper device for a motor vehicle window, with a wiper arm adapter unit and a wiper blade adapter unit which form a positive connection in a mounted state.

It is proposed that the wiper device has a housing means which is fixedly arranged on the wiper blade adapter unit and which is provided for receiving the wiper arm adapter unit in a linear push in movement, with the result that a particularly simple coupling of the wiper blade adapter unit with the wiper arm adapter unit can be achieved. A "wiper blade adapter unit" is intended to be understood as meaning in this connection in particular an adapter unit which has a region of contact in relation to a wiper blade component and is captively connected to the wiper blade component and provided for making available a coupling region of the wiper blade component for a coupling and/or contacting with the wiper arm adapter unit. The wiper blade adapter unit preferably has a basic body which makes available a coupling surface for the coupling and/or contacting of the wiper arm adapter unit. A "wiper arm adapter unit" is to be understood as meaning in this connection in particular an adapter unit which has a region of contact in relation to a wiper arm component and is captively connected to the wiper arm component and provided for making available a coupling region of the wiper arm component for a coupling and/or contacting with the wiper blade adapter unit. "Provided" is to be understood as meaning in this connection in particular especially equipped and/or designed. A "mounted state" is to be understood as meaning in this connection in particular a state in which the wiper blade adapter unit and the wiper arm adapter unit are coupled to one another. A "longitudinal direction" is to be understood as meaning in this connection in particular a direction which extends at least substantially parallel to a main extension direction of the wiper arm adapter unit. "Substantially" is to be understood as meaning in this connection in particular a deviation of less than 10°. Here, a "housing means" is to be understood as meaning in this connection in particular a means which forms a substantially visible outer surface in at least a mounted state and makes available a receiving region for the wiper arm adapter unit. "Substantially visible" is to be understood as meaning in this connection discernible in particular at a glance.

In a further refinement, it is proposed that the wiper blade adapter unit has a locking means which is provided for avoiding a push movement of the wiper arm adapter unit in the mounted state, with the result that a particularly secure coupling of the wiper blade adapter unit with the wiper arm adapter unit can be achieved.

A particularly simple mounting of the wiper arm adapter unit with the wiper blade adapter unit can be achieved if the locking means is designed as latching means. "A latching means" is to be understood as meaning in this connection in particular a means which experiences an elastic deformation during a mounting sequence.

If the latching means is formed in one piece with a basic body of the wiper blade adapter unit, the wiper device can be produced in a particularly simple manner. "In one piece" is to be understood in particular as meaning integrally bonded, such as, for example, by a welding process and/or adhesive bonding process, etc., and particularly advantageously as meaning integrally formed, such as through production by casting or production in a single or multi component injection molding process.

Furthermore, it is proposed that the locking means is pivotably mounted about a pivot axis. As a result, a mounting of the wiper arm adapter unit with the wiper blade adapter unit can take place in a particularly simple manner.

If the pivot axis is arranged at least substantially parallel to a longitudinal direction of the wiper arm adapter unit, a coupling of the wiper blade adapter unit with the wiper arm adapter unit can be achieved in a particularly reliable manner. "Substantially" is to be understood in this connection as meaning in particular a deviation of less than 10°.

In a further refinement, it is proposed that the pivot axis is arranged at least substantially parallel to a transverse direction of the wiper arm adapter unit, with the result that a particularly simple construction of the wiper arm adapter unit can be achieved. A "transverse direction" is to be understood in this connection as meaning in particular a direction which is perpendicular to the longitudinal direction and perpendicular to a vertical direction and runs parallel to a wiping plane. A "wiping plane" is to be understood as meaning in this connection in particular an idealized plane which, in an operating state, is wiped by a wiper blade fastened to the wiper blade adapter unit. Here, a "vertical direction" is to be understood as meaning in this connection in particular a direction which is perpendicular to the wiping plane.

If, in at least one operating state, the housing means forms at least a large part of a visible outer surface of the wiper blade adapter unit, the wiper device can be designed to be particularly robust. A "large part" is to be understood in this connection as meaning in particular more than 50%, preferably more than 70%.

If the housing means has at least one at least largely closed side wall, the wiper device can be advantageously protected from external influences, such as, for example, water.

In a further refinement, it is proposed that the wiper device has at least one securing means which is provided for avoiding a movement of the locking means in at least one operating state, with the result that an operational reliability of the wiper device can be advantageously increased.

BRIEF DESCRIPTION OF THE DRAWINGS

Further advantages will become apparent from the description of the drawing which follows. Exemplary embodiments of the invention are illustrated in the drawings. The drawings, the description and the claims contain numerous features in combination. A person skilled in the art will expediently also consider the features individually and put them together to form meaningful further combinations.

In the drawings.

DETAILED DESCRIPTION

Figure 1A:
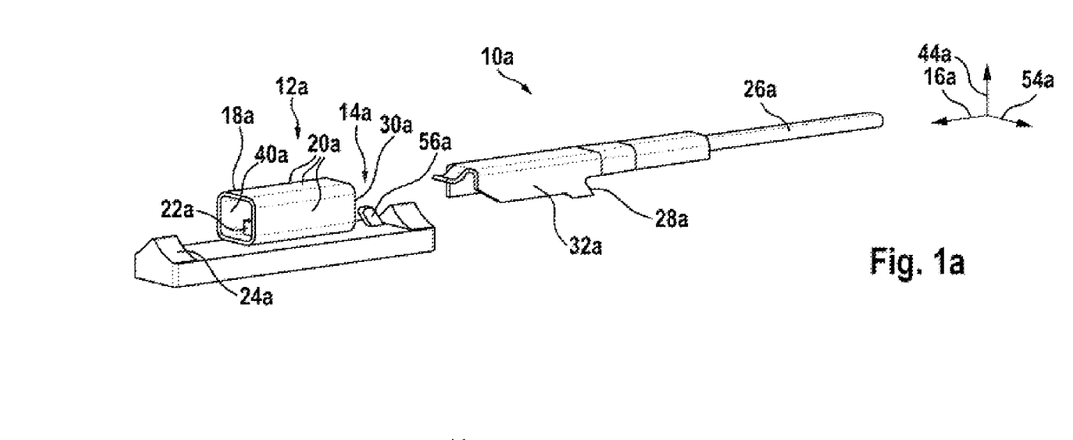
FIGS. 1a and 1b show a perspective view of a wiper device in a mounting sequence.

FIG. 1a shows a wiper device according to the invention with a wiper arm adapter unit 10a and a wiper blade adapter unit 12a in an opened state.

The wiper blade adapter unit 12a has a basic body 22a which is connected to a wiper blade 24a. Fixedly arranged on the basic body 22a is a housing means 18a which partially rests on the wiper blade 24a.

The housing means 18a has three side walls 20a which are each closed and form a large part of a visible outer surface of the wiper blade adapter unit 12a. In a longitudinal direction 16a, the housing means 18a is opened and thus allows the wiper arm adapter unit 10a to be received in a linear push in movement.

The wiper arm adapter unit 10a is formed in one piece with a wiper arm 26a. However, it is also conceivable in this connection to form the wiper arm adapter unit 10a separately from the wiper arm 26a and to connect them to one another via a suitable connecting element.

Figure 1B:
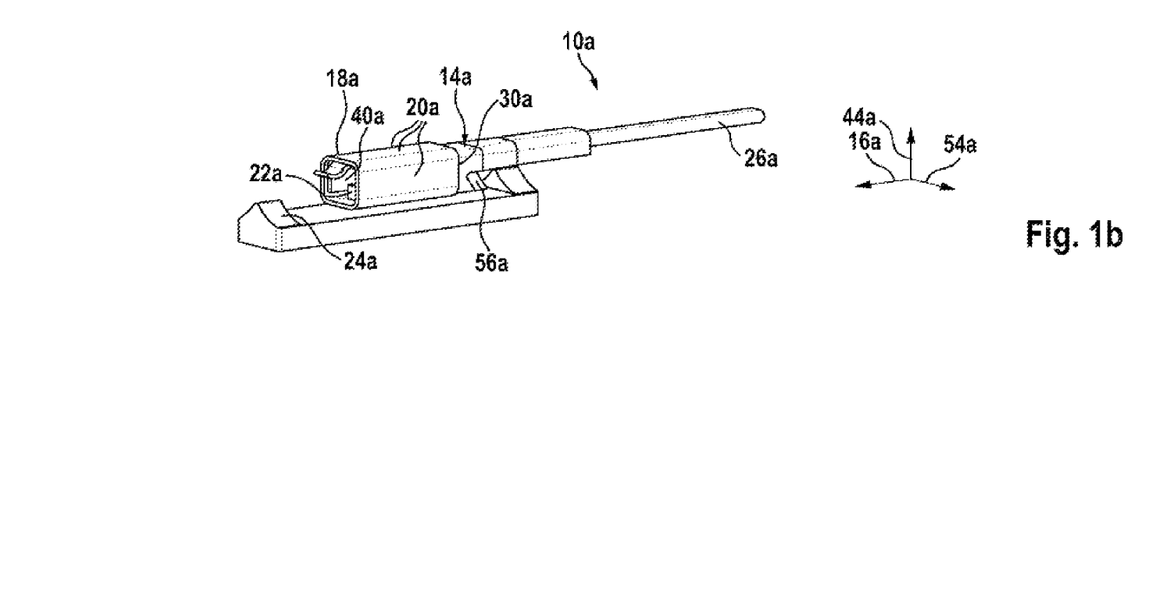

FIG. 1b shows the wiper device in a mounted state. The wiper arm adapter unit 10a has been pushed into the housing means 18a. Side walls 32a of the wiper arm adapter unit 10a terminate flush with an inner surface 40a of the three side walls 20a of the wiper blade adapter unit 12a. A movement of the wiper arm adapter unit 10a in a transverse direction 54a and in a vertical direction 44a is thus avoided.

A locking means 14a arranged on the wiper blade adapter unit 12a and designed as latching means 56a formed in one piece with the basic body 22a terminates flush with rear stops 28a of the wiper arm adapter unit 10a. The latching means 56a is arranged at an opening 30a of the housing means 18a and, during an insertion of the wiper arm adapter unit 12a into the housing means 18a, is deflected in the transverse direction 54a from a starting position. In the mounted state, the latching means 56a moves back into its starting position.

A push out movement of the wiper arm adapter unit 10a parallel to the longitudinal direction 16a is thereby avoided. The wiper arm adapter unit 10a forms a positive connection with the wiper blade adapter unit 12a.

FIGS. 2 to 6 show five further exemplary embodiments of the invention. The descriptions which follow are substantially restricted to the differences between the exemplary embodiments, it being possible to make reference to the description of the first exemplary embodiment with regards to components, features and functions which remain the same. To distinguish the exemplary embodiments, the letter a has been replaced in the reference signs of the exemplary embodiments in FIG. 1 by the letters b to fin the reference signs of the exemplary embodiments of FIGS. 2 to 6. Regarding identically denoted components, in particular with regard to components having identical reference signs, reference can also be made in principle to the drawings and/or the description of the first exemplary embodiment.

Figure 2A:
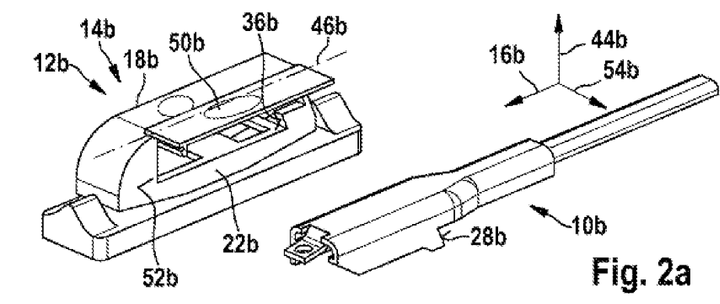
FIGS. 2a to 2c show a perspective view of a further exemplary embodiment of a wiper device in a mounting sequence.

FIG. 2a shows a further exemplary embodiment of a wiper device with a wiper arm adapter unit 10b and a wiper blade adapter unit 12b in an opened state. The wiper arm adapter unit 10b corresponds to the wiper arm adapter unit 10a from the first exemplary embodiment.

The wiper blade adapter unit 12b has a housing means 18b and also a locking means 14b which is pivotably mounted about a pivot axis 46b and which is formed as a cover flap 50b. The pivot axis 46b is arranged substantially parallel to a longitudinal direction 16b.

The wiper blade adapter unit 12b further has a basic body 22b which is formed in one piece with the housing means 18b. The housing means 18b forms a large part of a visible outer surface 52b of the wiper blade adapter unit 12b. Moreover, a counter stop 36b is arranged on the basic body 22b.

The cover flap 50b is arranged laterally on the wiper blade adapter unit 12b and thus allows the wiper arm adapter unit 10b to be received in a linear movement which runs substantially parallel to a transverse direction 54b.

Figure 2B:
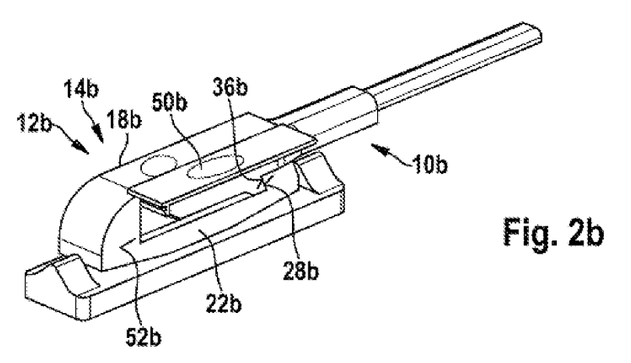

FIG. 2b shows a second mounting step in which the wiper arm adapter unit 10b has been pushed into the basic body 22b. The outer surface 52b limits a freedom of movement of the wiper arm adapter unit 10b in a vertical direction 44b.

The counter stop 36b forms a positive connection with a rear stop 28b of the wiper arm adapter unit 10b. A freedom of movement of the wiper arm adapter unit 10b is consequently limited in the longitudinal direction 16b. A movement of the wiper arm adapter unit 10b is possible only parallel to the transverse direction 54b.

Figure 2C:
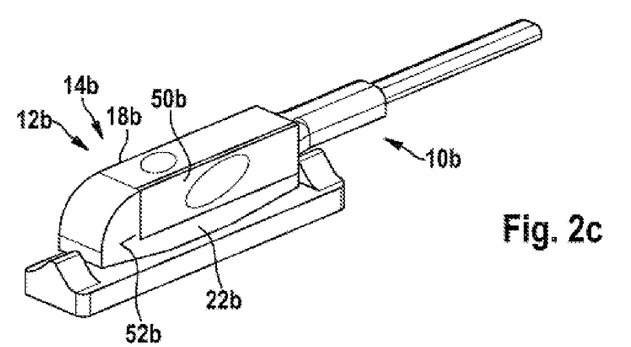

FIG. 2c shows the wiper device in a mounted state. The cover flap 50b is closed and terminates flush with the outer surface 52b of the wiper blade adapter unit 12b. As a result, the wiper arm adapter unit 10b is limited in its freedom of movement in the transverse direction 54b.

Figure 3A:
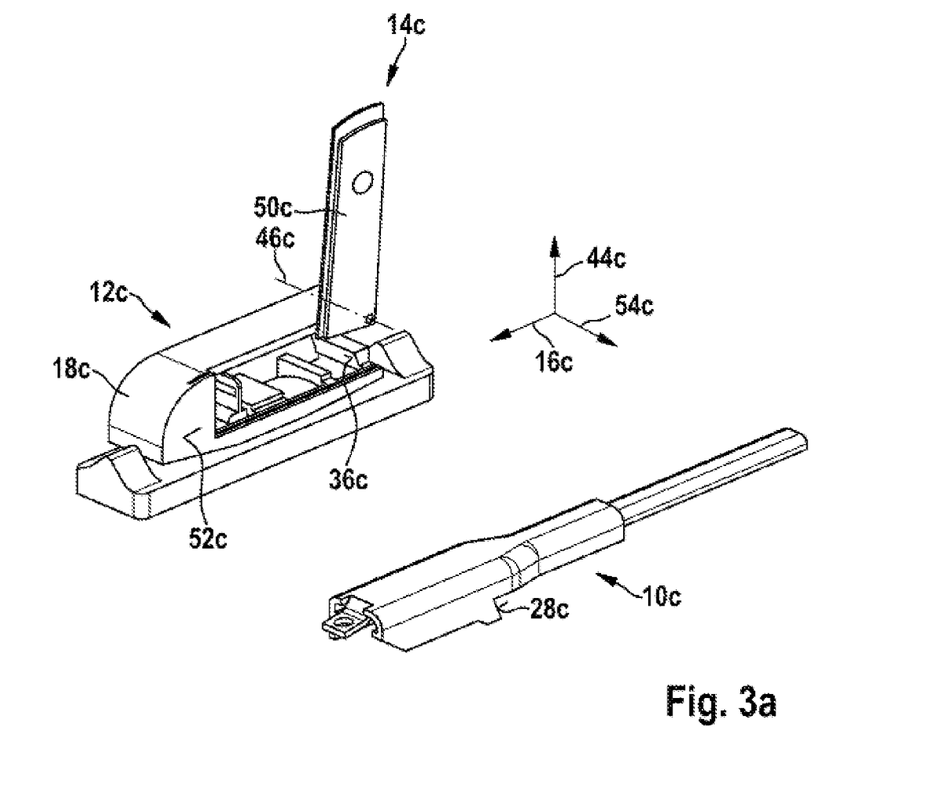
FIGS. 3a to 3c show a perspective view of a further exemplary embodiment of a wiper device in a mounting sequence.

FIG. 3a shows a further exemplary embodiment of a wiper device with a wiper arm adapter unit 10c and a wiper blade adapter unit 12c in an opened state. The wiper arm adapter unit 10c corresponds to the wiper arm adapter unit 10a from the first exemplary embodiment.

The wiper blade adapter unit 12c has a housing means 18c with a locking means 14c which is formed as a cover flap 50c. The cover flap 50c is pivotably mounted about a pivot axis 46c. The pivot axis 46c is arranged substantially parallel to a transverse direction 54c of the wiper arm adapter unit 10c.

The housing means 18c has a visible outer surface 52c of the wiper blade adapter unit 12c. Furthermore, a counter stop 36c is arranged on the housing means 18c.

The cover flap 50c is arranged laterally on the wiper blade adapter unit 12c and thus allows the wiper arm adapter unit 10c to be received in a linear movement which runs substantially parallel to the transverse direction 54c.

Figure 3B:
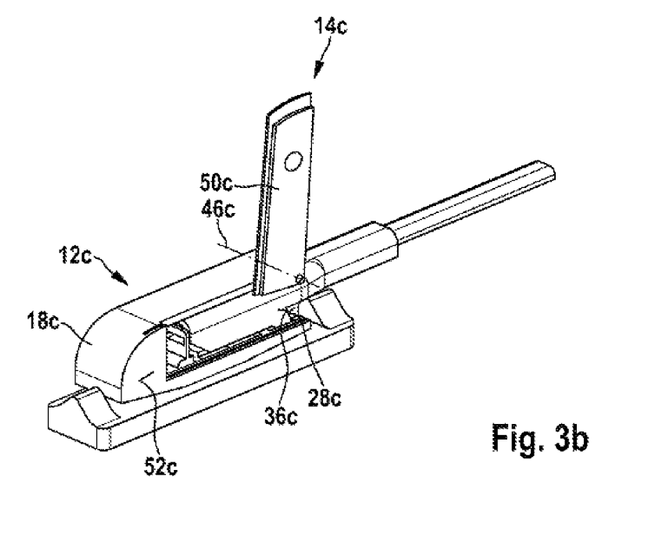

FIG. 3b shows the wiper device in a second mounting step in which the wiper arm adapter unit 10c has been pushed into the housing means 18c. The outer surface 52c limits a freedom of movement of the wiper arm adapter unit 10c in a vertical direction 44c.

The counter stop 36c forms a positive connection with a rear stop 28c of the wiper arm adapter unit 10c. A freedom of movement of the wiper arm adapter unit 10c is thereby limited in a longitudinal direction 16c. A movement of the wiper arm adapter unit 10c is possible only in the transverse direction 54c.

Figure 3C:
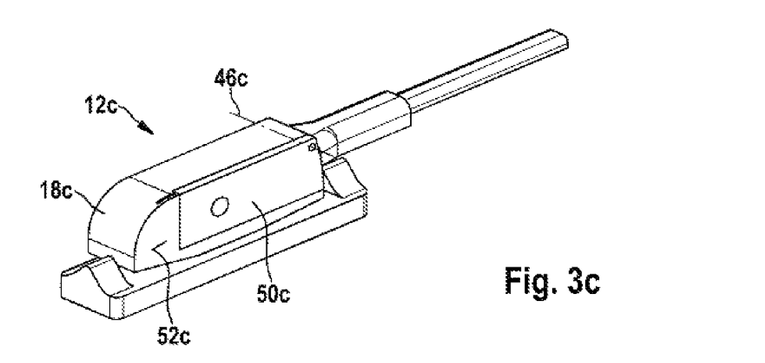

FIG. 3c shows the wiper device in a mounted state. The cover flap 50c has been pivoted about the pivot axis 46c and terminates flush with the outer surface 52c of the wiper blade adapter unit 12*c*. The wiper arm adapter unit 10*c* is limited by the cover flap 50*c* in its freedom of movement in the transverse direction 54*c*.

Figure 4A:
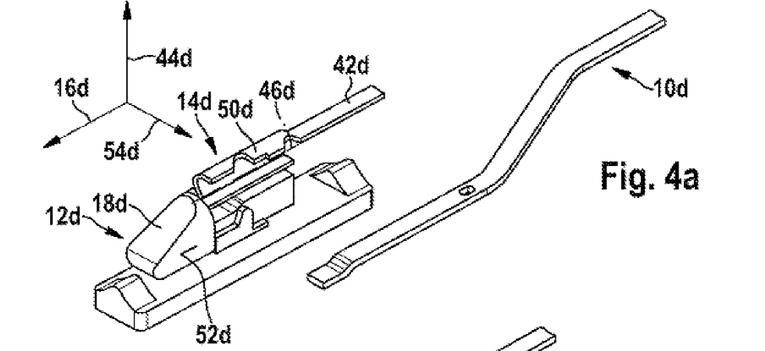
FIGS. 4a to 4c show a perspective view of a further exemplary embodiment of a wiper device in a mounting sequence.

FIG. 4*a* shows a further exemplary embodiment of a wiper device with a wiper arm adapter unit 10*d* and a wiper blade adapter unit 12*d* in an opened state.

The wiper blade adapter unit 12*d* has a housing means 18*d* with outer surfaces 52*d* and with a locking means 14*d* which is formed by a cover flap 50*d* which is pivotably mounted about a pivot axis 46*d*. The pivot axis 46*d* extends parallel to a longitudinal direction 16*d*.

Figure 4B:
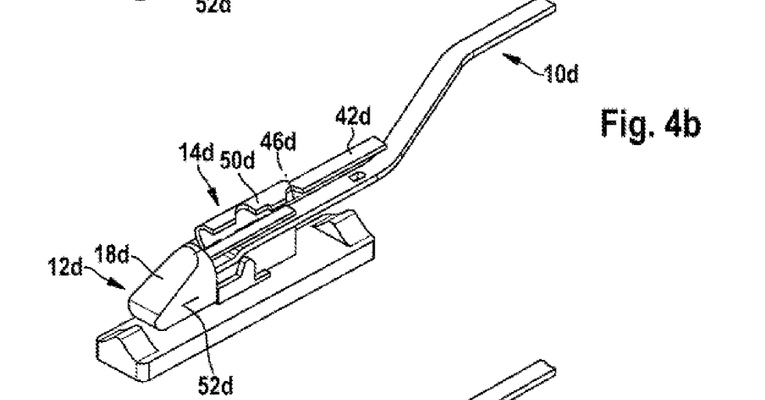

FIG. 4*b* shows the wiper device in a second mounting step. The wiper arm adapter unit 10*d* has been pushed into the housing means 18*d* of the wiper blade adapter unit 12*d*. The wiper arm adapter unit 10*d* is limited in a vertical direction 44*d* and also in the longitudinal direction 16*d* in its freedom of movement by the outer surfaces 52*d*. A movement of the wiper arm adapter unit 10*d* is possible only in a transverse direction 54*d*.

Figure 4C:
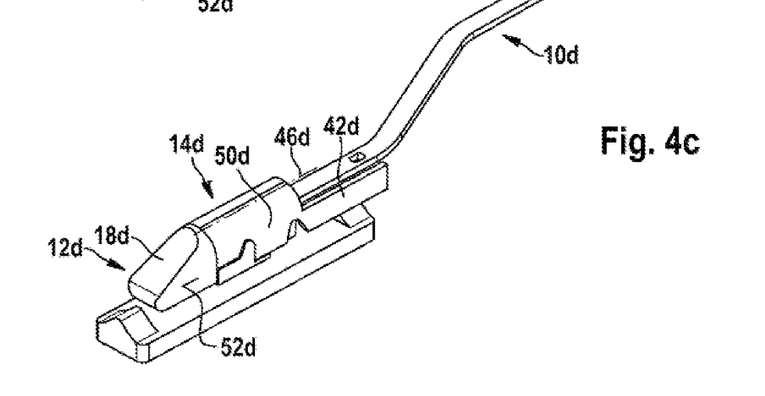

FIG. 4*c* shows the wiper device in a mounted state. The cover flap 50*d* has been pivoted onto the housing means 18*d* and terminates flush with the outer surfaces 52*d*. Securing means 42*d* arranged on the cover flap 50*d* latch into place on the housing means 18*d* and prevent the cover flap 50*d* from pivoting back into the opened state.

Figure 5A:
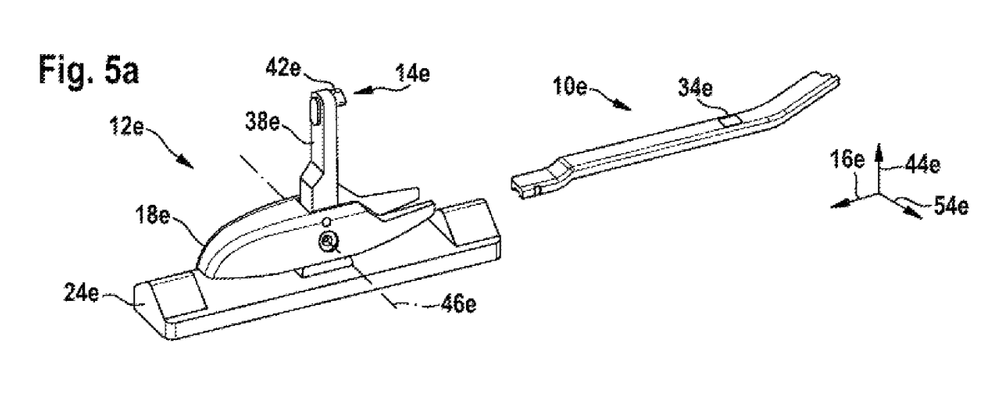
FIGS. 5a to 5c show a perspective view of a further exemplary embodiment of a wiper device in a mounting sequence and FIGS. 6a and 6b show a perspective view of a further exemplary embodiment of a wiper device in a mounting sequence.

FIG. 5*a* shows a further exemplary embodiment of a wiper device with a wiper arm adapter unit 10*e* and a wiper blade adapter unit 12*e* in an opened state. The wiper arm adapter unit 10*e* has a fastening cutout 34*e* and is formed in one piece with a wiper arm 26*e*.

The wiper blade adapter unit 12*e* has a fixedly arranged housing means 18*e* which rests partially on a wiper blade 24*e* and is opened in a longitudinal direction 16*e*. On the housing means 18*e*, a locking means formed as a lever arm 38*e* is mounted pivotably about a pivot axis 46*e*. The lever arm 38*e* has at one end a securing means 42*e* which is designed as a fastening pin. The pivot axis 46*e* is arranged substantially parallel to a transverse direction 54*e*.

Figure 5B:
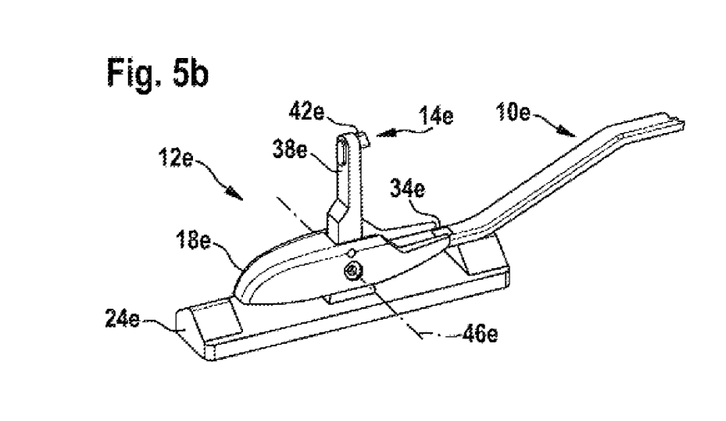

FIG. 5*b* shows the wiper device in a second mounting step. The wiper arm adapter unit 10*e* has been pushed into the housing means 18*e* of the wiper blade adapter unit 12*e* in the longitudinal direction 16*e*. A movement of the wiper arm adapter unit 10*e* relative to the wiper blade adapter unit 12*e* in a vertical direction 44*e* or in the transverse direction 54*e* is thus avoided.

Figure 5C:
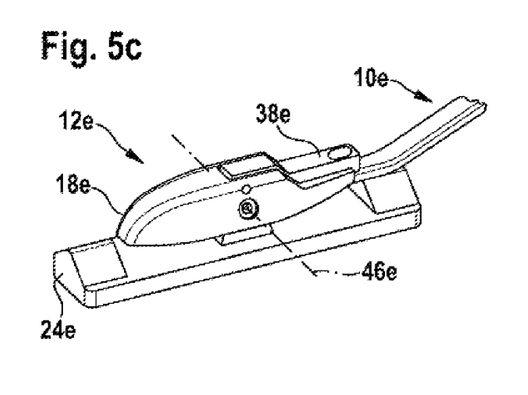

FIG. 5*c* shows the wiper device in a mounted state. The lever arm 38*e* has been pivoted about the pivot axis 46*e* and rests on the wiper arm adapter unit 10*e*. The securing means 42*e* has been introduced into the fastening cutout 34*e* and forms a positive connection therewith. Consequently, a push out movement of the wiper arm adapter unit 10*e* in the longitudinal direction 16*e* is avoided.

In order to avoid the lever arm 38*e* being pivoted back into the opened state, the securing means 42*e* additionally forms a non-positive connection with the fastening cutout 34*e*.

Figure 6A:
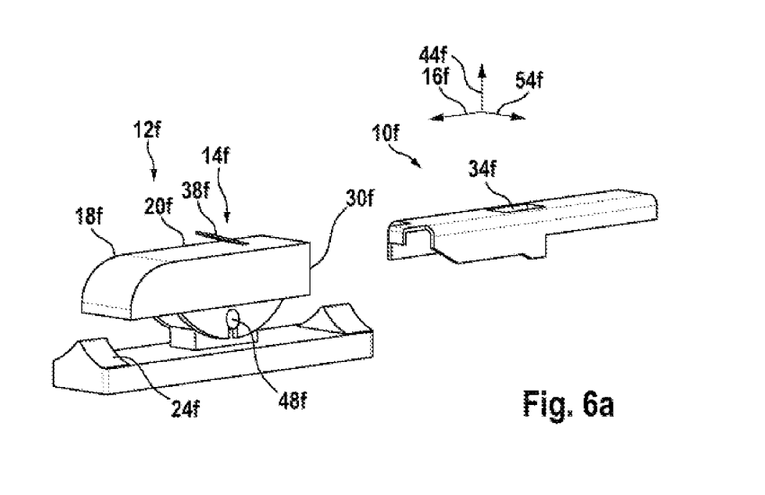

FIG. 6*a* shows a further exemplary embodiment of a wiper device with a wiper arm adapter unit 10*f* and a wiper blade adapter unit 12*f* in an opened state. The wiper arm adapter unit 10*f* corresponds to the wiper arm adapter unit 10*a* from the first exemplary embodiment.

The wiper blade adapter unit 12*f* has a housing means 18*f* which is connected to a wiper blade 24*f* via a swivel joint 48*f*. A locking means 14*f* which is formed by a pivotably mounted lever arm 38*f* is arranged on a side wall 20*f* of the housing means 18*f* that is directed away from the wiper blade 24*f*. The housing means 18*f* has an opening 30*f* in a longitudinal direction 16*f*.

Figure 6B:
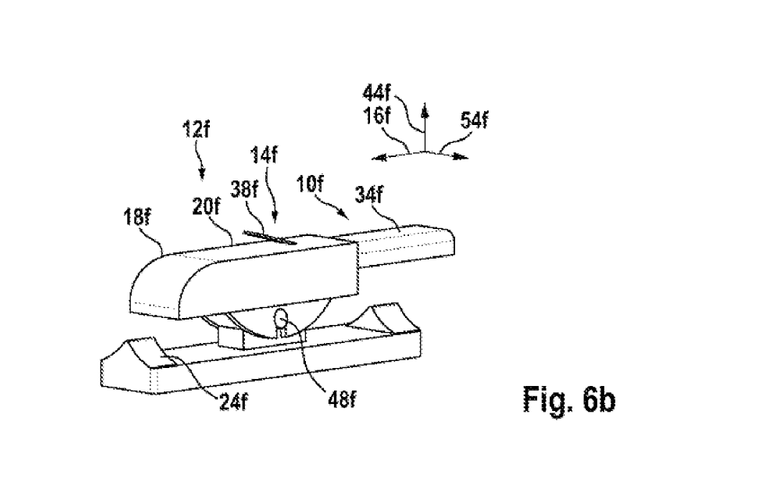

FIG. 6*b* shows the wiper device in a mounted state. The wiper arm adapter unit 10*f* has been pushed into the housing means 18*f*. A freedom of movement in a vertical direction 44*f* and in a transverse direction 54*f* is thereby limited. By pivoting the lever arm 38*f*, the latter terminates flush with the side wall 20*f* At the same time, the lever arm 38*f* engages in a fastening cutout 34*f* in the wiper arm adapter unit 10*f*, and thus avoids a push out movement of the wiper arm adapter unit 10*f*.

What is claimed is:

1. A wiper device for a motor vehicle window, with a wiper arm adapter unit (10*a*-10*f*) extending along a longitudinal direction (16*a*-16*f*) and a wiper blade adapter unit (12*a*-12*f*) which form a positive connection in a mounted state, characterized by a housing means (18*a*-18*f*) which is fixably arranged on a basic body (22*a*-22*b*) of the wiper blade adapter unit (12*a*-12*f*) and which receives the wiper arm adapter unit (10*a*-10*f*) in a linear push-in movement of the wiper arm adapter unit (10*a*-10*f*)along the longitudinal direction (16*a*-16*f*), characterized in that the positive connection requires only the linear push-in movement of the wiper arm adapter unit (10*a*-10*f*) along the longitudinal direction (16*a*), wherein the wiper blade adapter unit (12*a*-12*f*)includes a latching means (56*a*) that avoids a push out movement of the wiper arm adapter unit (10*a*-10*f*) in the mounted state, wherein the latching means (56*a*) projects upwardly along a vertical direction (44*a*) from the basic body (22*a*-22*b*), wherein the wiper arm adapter unit (10*a*-10*f*) includes a projecting, rear back stop (28*a*-28*c*) that abuts the latching means (56*a*) in the mounted state, wherein the rear back stop (28*a*-28*c*) projects downwardly, and wherein the latching means (56*a*) is flexible and is temporarily deflected in a transverse direction (54*a*) when the wiper arm adapter unit (10*a*-10*f*) is mounted to the wiper blade adapter unit (12*a*-12*f*), the transverse direction (54*a*) being perpendicular to both the longitudinal direction (16*a*) and the vertical direction (44*a*).

2. The wiper device as claimed in claim 1, characterized in that the latching means (56*a*) is formed in one piece with the basic body (22*a*) of the wiper blade adapter unit (12*a*).

3. The wiper device as claimed in claim 1, characterized in that the housing means (18*a*-18*f*) forms, in at least one operating state, at least a large part of a visible outer surface of the wiper blade adapter unit (12*a*-12*f*).

4. The wiper device as claimed in claim 1, characterized in that the housing means (18*a*) has at least one at least largely closed side wall (20*a*).

5. The wiper device as claimed in claim 1, wherein the rear back stop (28*a*-28*c*) projects downwardly from a sidewall (32*a*) of the wiper arm adapter unit (10*a*-10*f*).

6. The wiper device as claimed in claim 1, wherein the wiper arm adapter unit (10*a*-10*f*) includes a plurality of rear back stops (28*a*-28*c*).

7. The wiper device as claimed in claim 1, wherein the latching means (56) includes a first surface projecting up from the basic body (22*a*-22*b*) at an angle relative to the longitudinal direction, and the rear back stop (28*a*-28*c*) includes a second surface projecting down at the same angle relative to the longitudinal direction, such that the first surface is in abutting contact with the second surface after the wiper arm adapter unit (10*a*-10*f*) has been mounted to the wiper blade adapter unit (12*a*-12*f*).

8. The wiper device as claimed in claim 7, wherein the first surface is a planar surface and the second surface is a planar surface.

9. The wiper device as claimed in claim 1, wherein after the wiper arm adapter unit (10a-10f) has been mounted to the wiper blade adapter unit (12a-12f), a surface of the latching means (56a) is flush with a surface of the rear back stop (28a-28c).

* * * * *